(12) United States Patent
Cao et al.

(10) Patent No.: US 10,164,440 B2
(45) Date of Patent: Dec. 25, 2018

(54) METHOD OF BALANCING BATTERY POWER

(71) Applicant: Silergy Semiconductor Technology (Hangzhou) LTD, Hangzhou, ZheJiang Province (CN)

(72) Inventors: Hejinsheng Cao, Hangzhou (CN); Zhiyuan Shen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 138 days.

(21) Appl. No.: 15/283,551

(22) Filed: Oct. 3, 2016

(65) Prior Publication Data

US 2017/0110892 A1 Apr. 20, 2017

(30) Foreign Application Priority Data

Oct. 14, 2015 (CN) .......................... 2015 1 0663127

(51) Int. Cl.
*H01M 10/44* (2006.01)
*H02J 7/00* (2006.01)
(52) U.S. Cl.
CPC .......... *H02J 7/0014* (2013.01); *H02J 7/0077* (2013.01); *H02J 7/0021* (2013.01)
(58) Field of Classification Search
CPC ...... H02J 7/0014; H02J 7/0016; H02J 7/0018; H02J 7/0091
USPC ......... 320/107, 116, 118, 119, 132, 149, 150
See application file for complete search history.

(56) References Cited

U.S. PATENT DOCUMENTS

| 7,081,737 | B2 | 7/2006 | Liu et al. |
| 8,432,104 | B2 | 4/2013 | Hu et al. |
| 2005/0077875 | A1 | 4/2005 | Bohley |
| 2013/0099746 | A1* | 4/2013 | Nork .................. B60L 11/1866 320/118 |
| 2014/0163910 | A1 | 6/2014 | Yu et al. |
| 2014/0306662 | A1* | 10/2014 | Kim ...................... H02J 7/0016 320/118 |
| 2016/0061901 | A1* | 3/2016 | Kudo .................. G01R 31/362 324/426 |

FOREIGN PATENT DOCUMENTS

| CN | 102545309 A | 7/2012 |
| CN | 104426177 A | 3/2015 |

OTHER PUBLICATIONS

Translation of CN 102545309, Xu, Jul. 2012.*

* cited by examiner

*Primary Examiner* — Edward Tso
(74) *Attorney, Agent, or Firm* — Michael C. Stephens, Jr.

(57) ABSTRACT

A method of balancing battery power can include: determining batteries to be balanced and directions of balance currents according to charge and discharge states and power states of the batteries, where each of the power states includes a state of charge, a remaining capacity, and a capacity to be charged; determining a reference of the balance current based on controlling temperatures of the batteries to be balanced to be lower than a temperature threshold when the SOCs of the batteries to be balanced are lower than a predetermined threshold; and balancing power of the batteries to be balanced according to the directions of the balance currents and the reference.

8 Claims, 7 Drawing Sheets

METHOD OF BALANCING BATTERY POWER

RELATED APPLICATIONS

This application claims the benefit of Chinese Patent Application No. 201510663127.6, filed on Oct. 14, 2015, which is incorporated herein by reference in its entirety.

FIELD OF THE INVENTION

The present invention generally relates to the field of power electronics, and more particularly, to a method for balancing battery power.

BACKGROUND

With the increasing power of consumer electronics, the capacity of a battery pack applied in such consumer electronics is also increasing. Typically, a battery pack with a relatively large capacity may include several batteries. Thus, different batteries should be balanced during the operation process, in order to improve the utilization factor of the batteries. In addition, some of the batteries should be protected against being over-charged or over-discharged, as it may shorten the battery lifetime. In one approach, balancing battery power may be performed based on a voltage or a state of charge (SOC), but may not take the battery temperature into consideration. Thus aging of the lifetime of the battery may be accelerated as the battery temperature exceeds the normal operating temperature.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a method of balancing battery power can include: (i) determining batteries to be balanced and directions of balance currents according to charge and discharge states and power states of the batteries, where each of the power states includes a state of charge (SOC), a remaining capacity, and a capacity to be charged; (ii) determining a reference of the balance current based on controlling temperatures of the batteries to be balanced to be lower than a temperature threshold when the SOCs of the batteries to be balanced are lower than a predetermined threshold; and (iii) balancing power of the batteries to be balanced according to the directions of the balance currents and the reference.

Figure 1:
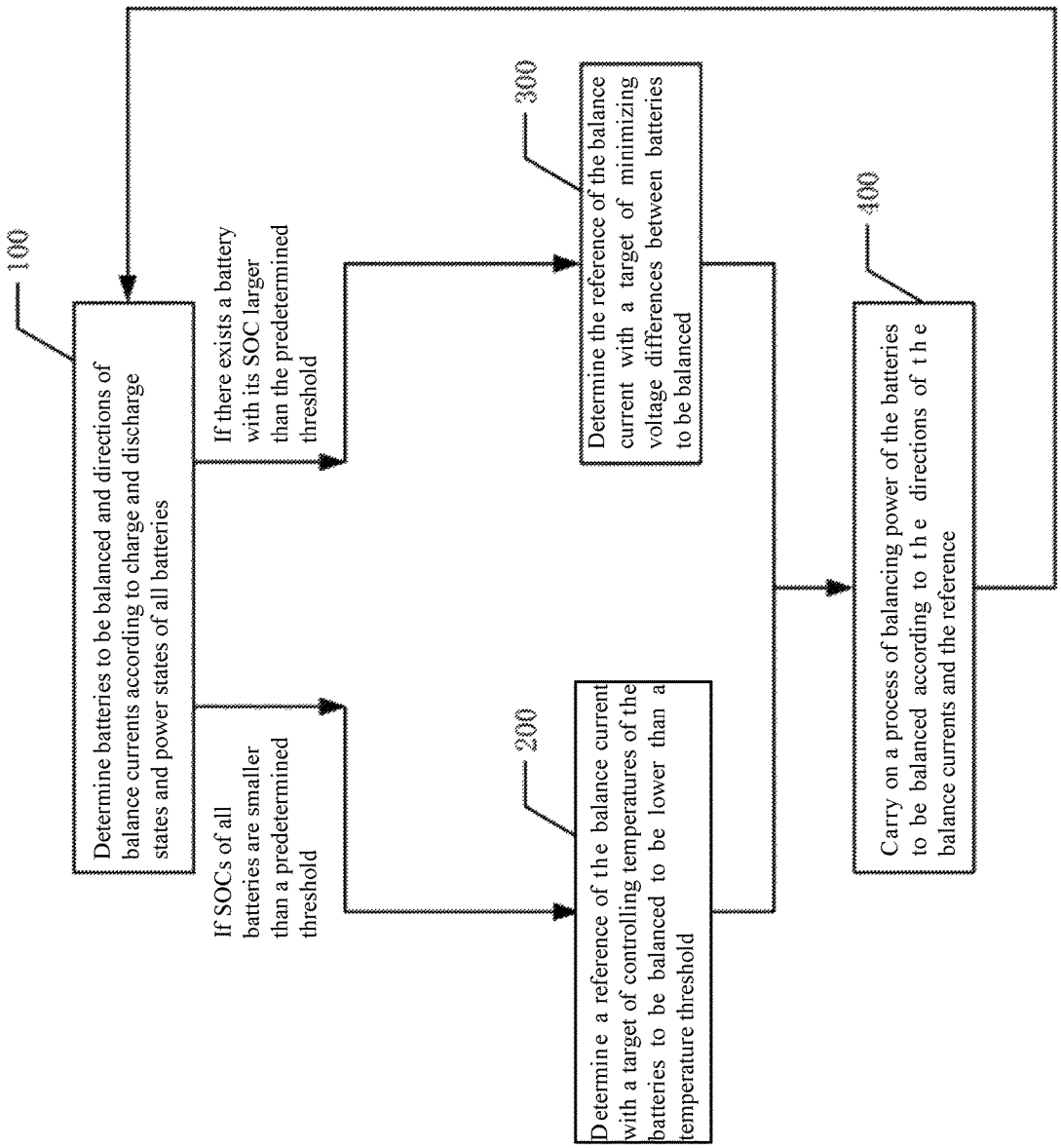
FIG. 1 is a flow diagram of an example method for balancing battery power, in accordance with embodiments of the present invention.

Referring now to FIG. 1, shown is a flow diagram of an example method for balancing battery power, in accordance with embodiments of the present invention. This particular example can include, at 100, determining batteries to be balanced and a direction of a balance current according to the charge and discharge states and the battery power states of all batteries. For example, the battery power state can include the state of charge (SOC), remaining capacity, and capacity to be charged. In one case, a couple of batteries to be balanced may be selected in 100, and the balance current can be transmitted from one battery to the other battery, in order to achieve power balance between the two batteries.

Figure 2:
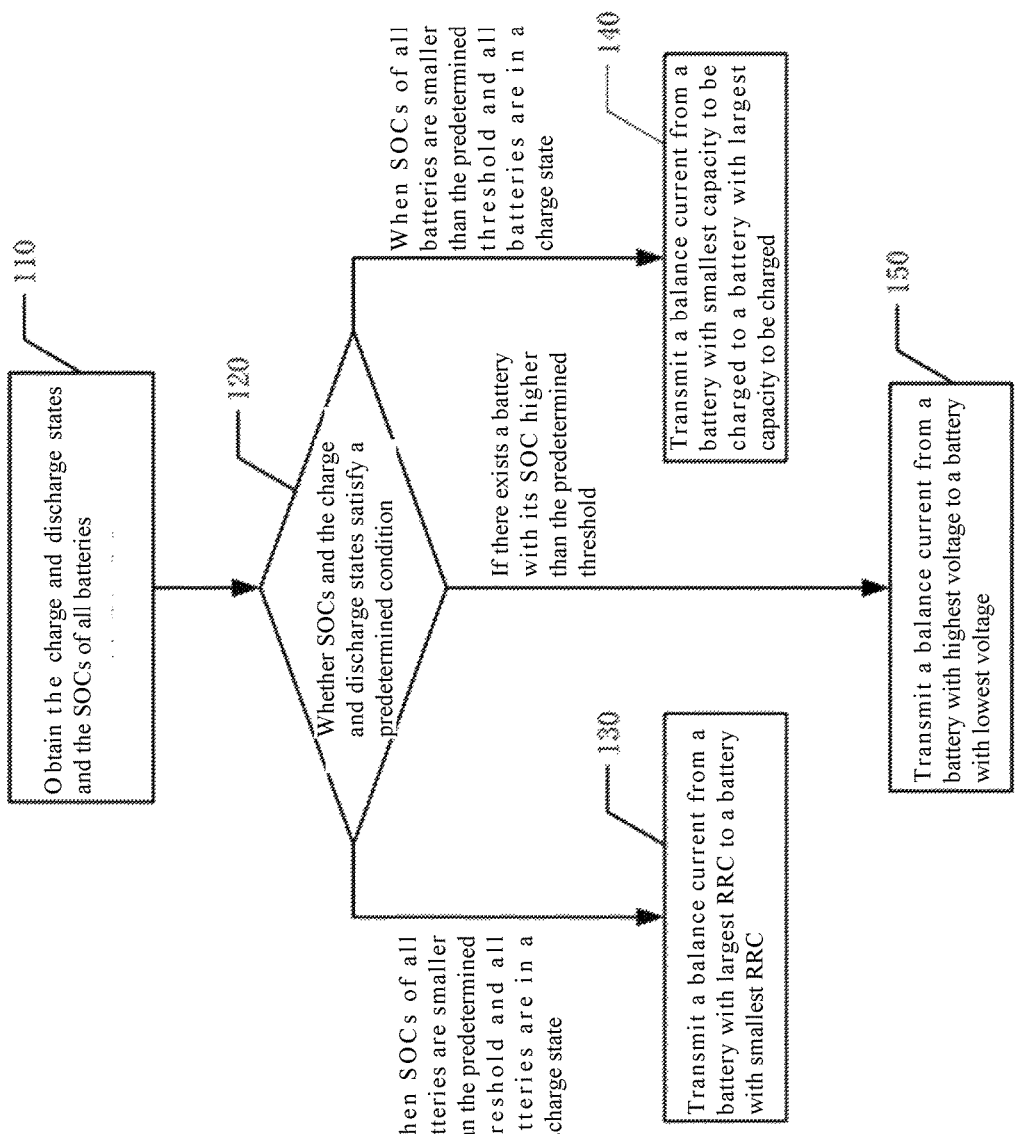
FIG. 2 is a flow diagram of an example process of choosing a battery to be balanced and a direction of a balance current, in accordance with embodiments of the present invention.

Referring now to FIG. 2, shown is a flow diagram of an example process of choosing a battery to be balanced and a direction of a balance current, in accordance with embodiments of the present invention. In this particular example, 100 may include, at 110, obtaining the charge and discharge states and the SOCs of all batteries. For example, in order to obtain the state of a battery more accurately, the battery may not be charged or discharged until the battery voltage equals the open circuit voltage (OCV) when the battery current is lower than a current threshold. Then, the charge and discharge states and SOCs can be obtained by detecting the battery. For example, a battery management system (BMS) can be used to detect and update the battery state after the battery voltage recovers the open circuit voltage, and to further balance the battery power, in order to accurately obtain the battery state.

At 120, whether the SOC and the charge and discharge state of the battery satisfy a predetermined condition or not, can be determined. For example, 130 may be performed when the SOCs of all batteries are all less than a predetermined threshold (e.g., about 90%) and all the batteries are in a discharge state. Also, 140 may be performed when the SOCs of all batteries are all less than the predetermined threshold, and all the batteries are in a charge state. It should be understood that the judgements described above may be compound conditions that involve several judging sub-steps. For example, such a step may include initially determining the SOC, and then judging the charge and discharge state of the battery.

Alternatively, such a step may include initially judging the charge and discharge state of the battery, and then determining if the SOC is less than the predetermined threshold.

The state of charge (SOC) value may be used to indicate a ratio of a relative remaining capacity (RRC) to a full charge capacity (FCC) of a battery. The SOC is usually expressed in percentage in the range of 0-1. For example, SOC=0 may indicate that the battery is completely discharged, and SOC=1 may indicate that the battery is fully charged. In this particular example, the predetermined threshold may be 90%.

At 130, the balance current may flow from a battery with the maximum remaining capacity to a battery with the minimum remaining capacity when the SOCs of all batteries are less than the predetermined threshold and all batteries are in the discharge state. In the discharge state, the SOC of the battery that has a smaller FCC may decrease faster when the batteries are discharged, so the SOC of the battery that has the smaller FCC may be the first to reach zero if the battery power is not balanced. In such a condition, the battery may be over discharged when being further discharged, but the SOCs of the remaining batteries may not be zero as power can remain, and thus the battery power can be efficiently utilized.

Therefore, the SOCs of all batteries may reach zero at substantially the same time. Put another way, the RRC of all batteries may be equal during the discharging process, such that the reference for balancing battery power during the discharging process is selected to be RRC rather than SOC. Such balancing battery power can cause the current to flow from a battery with a larger RRC to a battery with a smaller RRC. If it is expected that the FFC of a certain battery is larger than the FFC of another battery while the RRCs thereof are the same, battery power balance may be stopped in order to prevent the battery from being over discharged. At 140, the balance current may flow from a battery with the minimum capacity to be charged to a battery with the maximum capacity to be charged when the SOCs of all batteries are less than the predetermined threshold and all batteries are in the charge state. The capacity to be charged is a difference between FCC and RRC.

Similar to the discharge process, the SOC of the battery that has smaller FCC may increase faster than SOC of the battery that has larger FCC when the batteries are charged. The battery with the smaller FCC may be the first one to be fully charged if the battery power is not balanced. In such a condition, the battery may be over charged when being further charged, but the remaining batteries with larger FCCs may not be fully charged if the charging process is stopped once the battery with the smaller FCC is fully charged. Thus, the utilization factor will be lower, and using such a method for balancing battery power to fully charge all batteries substantially at the same time during the charging process can optimize the utilization factor.

In a case where the battery power is not balanced during the charging process, the SOC of a battery with a smaller FCC can be less than SOC of a battery with a larger FCC. A method for balancing battery power in particular embodiments can force the SOC of the batteries to reach 100% at substantially the same time regardless of the FCC. Thus, different batteries may need the same capacities to be charged (e.g., the differences between FCC and RRC are the same). For purposes of getting the SOC of all batteries to reach 100% at substantially the same time, the balance current may flow from a battery with a smaller difference between FCC and RRC to a battery with a larger difference between FCC and RRC during the charging process under the effect of a balance circuit. However, such procedure may actually be opposite to the charging process without using such power balance.

It should be understood that the approaches as described above with respect to steps 130 and 140 may also be used in determining batteries to be balanced and the direction of the balance current when the SOC of all batteries are higher than the predetermined threshold. For example, if SOC of any battery is higher than the predetermined threshold, the battery voltages can be relatively high either in charge state or discharge state. In such a case, if the balance current is too large, the batteries can be over charged, and/or due to the inside resistance of batteries, the voltage of the battery that the balance current flows therefrom may be lower than the open circuit voltage, while the voltage of the battery that the balance current flows into may be larger than the open circuit voltage. Thus, a voltage protection may result as the battery voltage may be too large due to the relatively large balance current. Therefore, the batteries to be balanced and the balance current can be selected based on the battery voltages, in order to ensure the safe utilization of batteries in such conditions.

For example, 120 may further include performing 150 when there is a battery with an SOC higher than the predetermined threshold. At 150, the balance current can be selected to flow from a battery of the maximum voltage to a battery of the minimum voltage. In addition, a lower reference may be provided for the balance current. In this way, the lifetime of the batteries can be prevented from being shortened due to a relatively large balance current generated in other approaches, by instead balancing battery power according to the battery voltages when the SOC of any battery is relatively high. Furthermore, the value of the balance current (e.g., the reference) may be determined after the batteries to be balanced and the direction of the balance current are determined.

Figure 3:
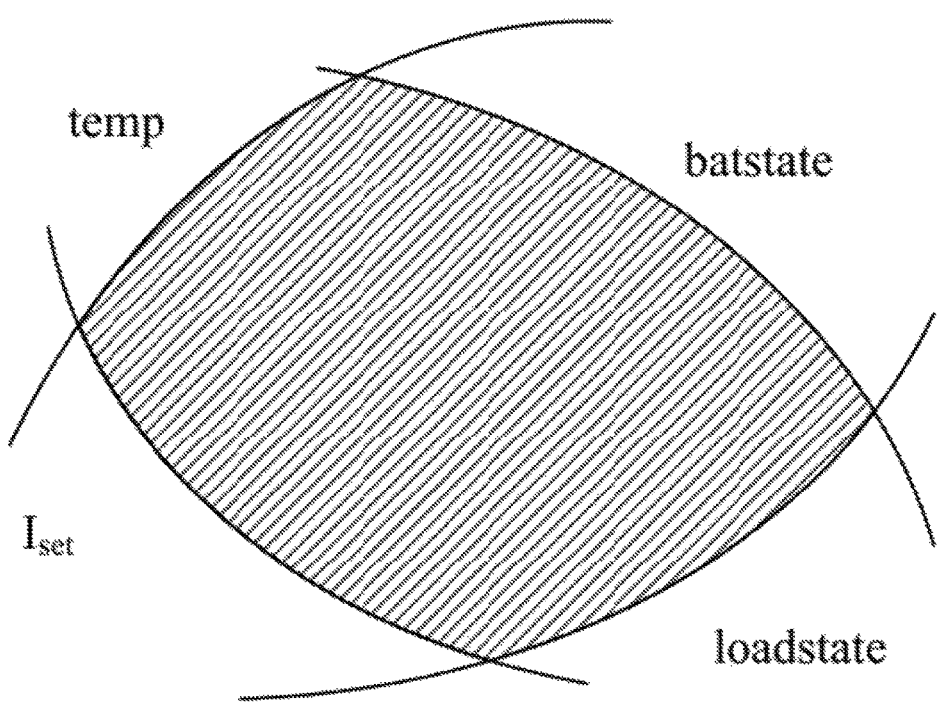
FIG. 3 is a diagram showing an example range of an expected balance current, in accordance with embodiments of the present invention.

Referring now to FIG. 3, shown is a diagram of an example range of an expected balance current, in accordance with embodiments of the present invention. In this particular example, the value of the balance current may be determined by four factors. The boundary conditions may be used to determine the value of the balance current, and the balance current can be a function of four factors, as shown below in (1).

$$I_{balance} = f(\text{temp}, \text{loadstate}, \text{batstate}, I_{set}) \qquad (1)$$

Here, "temp" represents the battery temperature, "loadstate" represents the load state of the current battery (e.g., the charge and discharge state, which indicates that the current battery is in a charge/discharge state or a static state, and the current value), "batstate" represents the power state of the batteries (e.g., SOC, RRC, FCC, etc.), and $I_{set}$ represents the maximum allowed current of the battery (e.g., the maximum charge and discharge current). The above four parameters may constitute constraints for the balance current, and the four boundary conditions can determine the safe operation area of the balance current. In particular embodiments, the balance current can be controlled to be within the safe operation range for a substantially optimal solution.

Referring also to FIG. 1, at 200, when the SOCs of batteries to be balanced are less than the predetermined threshold, 400 can be performed to determine the reference of the balance current with a target of controlling the temperature of batteries to be balanced to be lower than the temperature threshold. The lifetime and state of a battery may be highly dependent on the battery temperature. The lifetime of a battery may be extended by appropriately controlling the battery temperature to be within a suitable range, in order to improve the utilization factor of the battery. Also, the aging rate of different batteries may be relatively close to each other since the battery temperatures are maintained as close as possible. Thus, the aging degrees of all batteries may be substantially the same, such that the differential can be reduced and power losses caused by power balance can also accordingly be reduced. Certain embodiments may provide a control solution to maintain the temperatures of the batteries to be lower than the temperature threshold by regulating the balance current, such that the temperatures can remain within a suitable range, as described above. Further, the battery temperatures may be reduced to be lower than the temperature threshold by regulating the balance current in a case when the battery temperatures are inadvertently increased to be larger than the temperature threshold.

Figure 4:
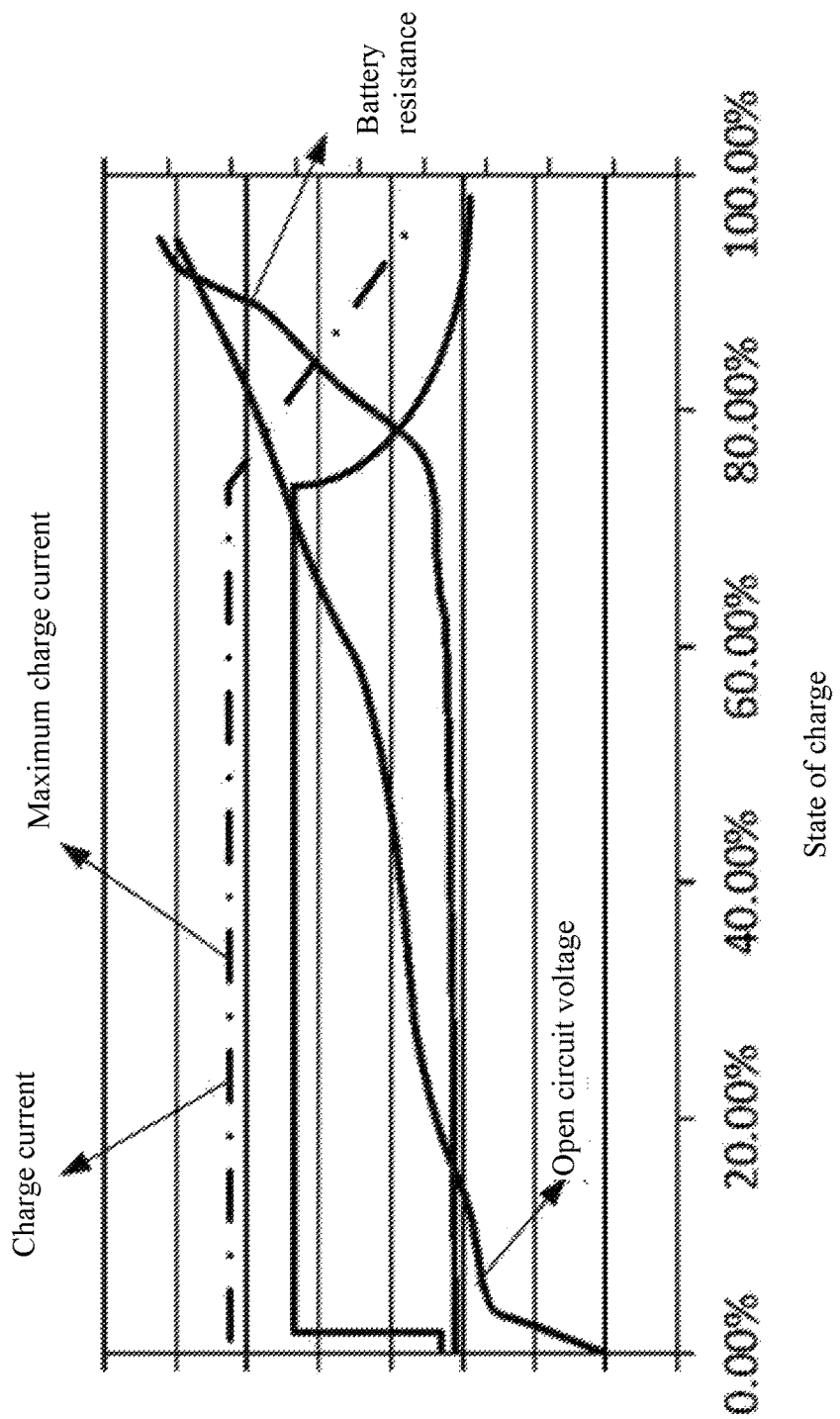
FIG. 4 is a curve diagram showing example state parameters of a battery in a charge mode, in accordance with embodiments of the present invention.

Referring now to FIG. 4, shown is a curve diagram of example state parameters of a battery in a charge mode, in accordance with embodiments of the present invention. In this particular example, the impedance of a lithium battery may increase along with the SOC during the charging process. If the battery power is not balanced, currents of all batteries may be equal, a battery with a relatively small FCC may have a large impedance corresponding to the large SOC, and the electrochemical reaction rate and the heat generation rate may be faster than a battery with a large FCC. As a result, the battery temperature can be higher, which can result in a faster aging rate. Also, FCC of the battery may be even smaller with the accelerated aging. As a result, the difference between the aging degrees of different batteries can be increased.

In particular embodiments, the current of a battery with a relatively large SOC can be partially transmitted to a battery with a small SOC through power balancing, so as to lower the temperature of the battery with the large SOC and to reduce its charging rate, and to increase the temperature of the battery with the small SOC and its charging rate. Thus, the SOC and temperatures of all batteries may be substantially the same, and the aging differences between batteries can be reduced as well as the battery power being balanced. In such a case, the balance current can be mainly selected in dependence on the battery temperature, such that the battery temperatures may be balanced. If the charge current is relatively large (e.g., in a fast and constant current charge mode), the balance current should not be too large due to the limitation of the maximum battery current. Thus, a bypass circuit can be employed to reduce the charge current of a battery with the large SOC when the temperature of a battery with the large SOC is relatively high and the battery is nearly fully charged, in order to reduce heat generation and prevent an over charge situation.

Figure 5:
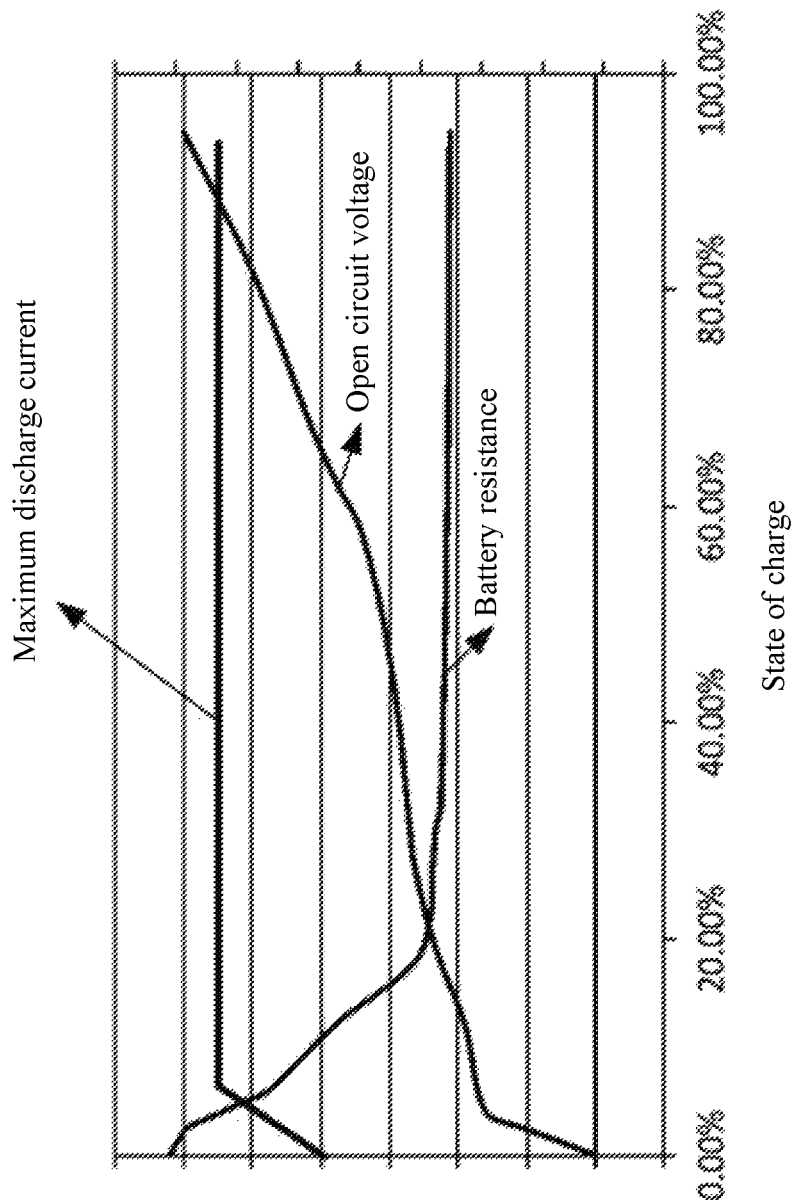
FIG. 5 is a curve diagram showing example state parameters of a battery in a discharge mode, in accordance with embodiments of the present invention.

Referring now to FIG. 5, shown is a curve diagram of example state parameters of a battery in a discharge mode, in accordance with embodiments of the present invention. In this particular example, the SOC of a battery may decrease and the internal resistance of the battery may increase during the discharging process. If the battery balance begins when the internal resistance has already increased, more heat and power losses can be generated for the same balance current, and the efficiency may be lower than the condition of a large SOC. Moreover, the battery may be almost fully discharged when the SOC is very small (e.g., the SOC is close to zero), and the balance pace may not be able to follow the discharge rate if the load current is very large. Thus, the balance process may not complete though the battery with the small SOC being already completely discharged, which may force the discharging process to be stopped. As a result, the utilization factor of the battery may be very low, and the battery balance should be started when the SOC is large.

For example, 200 may include, at 210, determining whether the directions of the battery current and the balance current are the same or not. Also, 220 can be executed if the directions are the same, or else 230 may be executed. In this particular example, the direction of the battery current refers to the practical direction of the battery current, whereby the battery current flows into the battery in a charging process and flows out of the battery in a discharging process. The direction of the balance current refers to the transmitting direction of a current between two batteries to be balanced in the process of balancing battery power.

At 220, a "first" reference can be obtained according to the temperature difference and gain $K_T$, and then 240 may be executed, where gain $K_T$ is a positive value. The temperature difference can be a difference between the temperature threshold and temperature $T_{bat}$ of the battery to be balanced. At 230, the first reference can be obtained according to the temperature difference and gain $-K_T$, where gain $-K_T$ is a negative value. At 240, the smaller one of the first reference and the maximum balance current can be selected as the reference of the balance current.

At this step, the maximum balance current may selected as the reference if the first reference is too large, so as to prevent the battery current from being larger than the maximum charge and discharge current when the balance process is carried on in accordance with such a too large first reference. Based on the above steps, the temperature regulation can be a negative feedback when the directions of the battery current and the balance current are same. Thus, the current reference of the balance current may be decreased to reduce the balance current, and to further reduce the battery current when the temperature of the battery is high. Also, the temperature regulation can be a positive feedback when the directions of the battery current and the balance current are opposite. Thus, the current reference of the balance current can be increased to enlarge the balance current, so as to reduce the battery current when the battery temperature is high. In this way, the battery temperature may be regulated to be lower than the temperature threshold.

At 300, the reference of the balance current can be determined by taking a target of minimizing the voltage difference between batteries to be balanced when the SOCs of batteries to be balanced are higher than the predetermined threshold. For example, 300 may include, at 310, obtaining a voltage error parameter, where the voltage error parameter is an error between voltage reference $V_{ref}$ (e.g., $V_{ref}=0$) and voltage difference $V_{diff}$. At 320, a "second" reference can be obtained according to the voltage error parameter and gain $K_V$, and the second reference may be taken as the reference of the balance current. When the SOC is higher than the predetermined threshold, a smaller balance current can be used to realize power balance for batteries with different battery voltage differences, so as to substantially guarantee the safe operation of the batteries.

Figure 6:
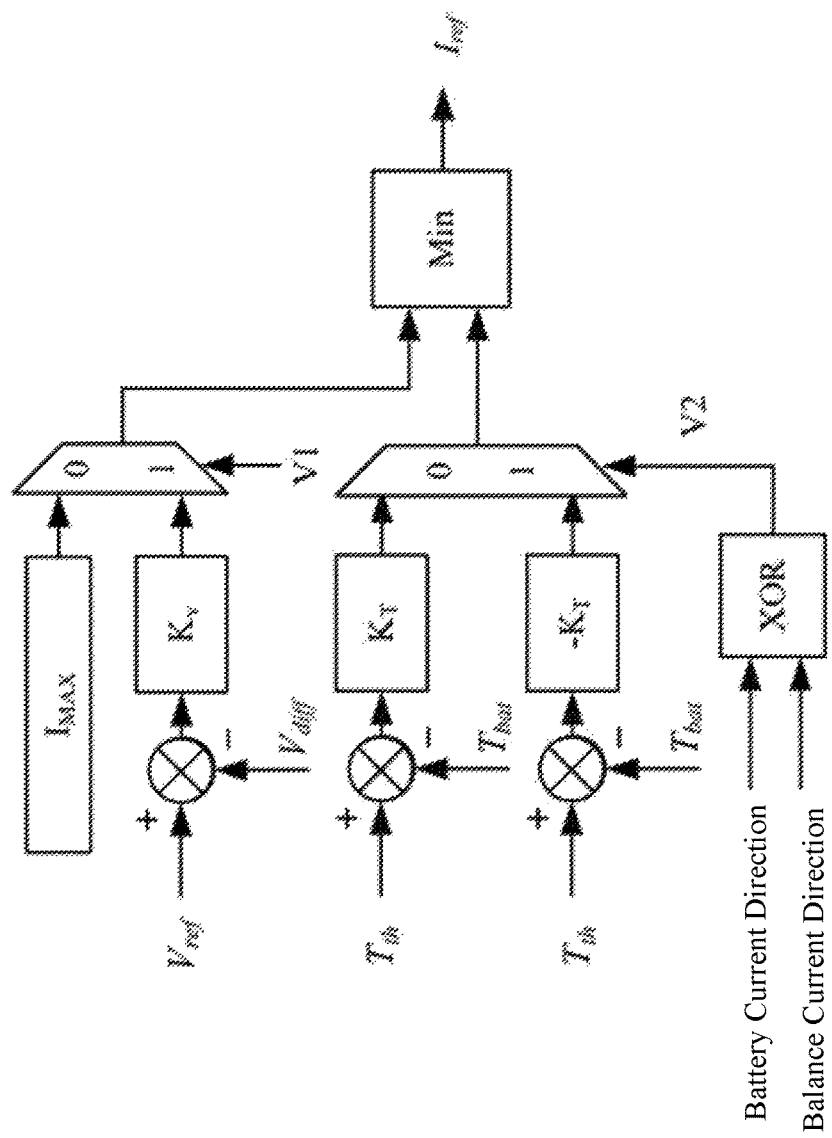
FIG. 6 is a block diagram showing an example control signal flow for determining a current reference, in accordance with embodiments of the present invention.

Referring now to FIG. 6, shown is a block diagram showing an example control signal flow for determining a current reference, in accordance with embodiments of the present invention. This particular diagram may illustrate example logic implementations of steps 200 and 300 in the form of block diagrams. A state signal V1 can be 1 when the SOC of all batteries are higher than the predetermined threshold, and the state signal V1 can be 0 when the SOC of all batteries are lower than the predetermined threshold. For example, the state indicating the balance current flows out can be 0, and the state indicating the balance current flows into can be 1. Battery temperature $T_{bat}$ may be provided to generate two first references, and an adder can be used to calculate the difference between temperature threshold $T_{th}$, and battery temperature $T_{bat}$. Also, amplifiers may be used to process the differences based on gain $K_T$ and gain $-K_T$, where the outputs of the amplifiers are provided to a selector. The control signal of the selector can be an XOR value V2 of the battery current direction and the balance current direction. For example, the control signal can be 0 when the directions are same. The selector may select to output the first reference of the upper circuit, and the temperature regulation can be a negative feedback. The control signal is 1 when the directions are opposite. In this case, the selector may choose to output the first reference of the lower circuit, and the temperature regulation can be a positive feedback.

The other selector can receive maximum balance current $I_{MAX}$ and the second reference which is obtained according to the error voltage and gain $K_V$. The error voltage can be obtained by an adder according to voltage reference $V_{ref}$ and voltage difference $V_{diff}$. When the state signal V1 is 0, the selector can output maximum balance current $I_{MAX}$. A minimum value selection device Min can be used to select the smaller one of the outputs of the two selectors as the reference $I_{ref}$ of the balance current. When state signal V1 is 1, the selector can output the second reference to realize power balance which is based on the voltage. The second reference may always be less than the first reference by appropriately setting gain $K_V$ such that the minimum value selection device can output the second reference as reference $I_{ref}$ of the balance current.

At 400 (see, e.g., FIG. 1), power balance may be carried out on batteries to be balanced according to the direction and the reference of the balance current. The above processes may be carried out either periodically or continuously, in order to realize power balance between a plurality of batteries. Batteries to be balanced and the direction of the balance current can be determined according to the charge and discharge states, as well as the battery power state. Also, the reference of the balance current can be determined by controlling the temperatures of batteries to be balanced to be lower than the predetermined threshold, in order to realize power balance in accordance with the balance current. Thus, the power balance control of batteries may include temperature control, and the SOCs and temperatures of batteries may be relatively close through the process of power balance, so as to achieve power balance between batteries and to reduce the aging differences between batteries.

In this way, certain embodiments can realize power balance in both charge and discharge processes relative to other solutions of realizing power balance in a charge process. Also, particular embodiments can use RRC and RRC to choose batteries to be balanced instead of taking the SOC as a reference in different charge and discharge states. Different selection schemes can also be employed under different states, in order to solve problems of carrying on power balance repeatedly based on the voltages or SOC. This can provide an optimal loop for the balance current, so as to reduce power losses that may be generated during the process of power balancing.

Moreover, certain embodiments can substantially avoid enlarging the aging differences between batteries due to the different aging rates that can result from large differences between battery temperatures by controlling the battery temperatures during the process of power balancing. The aging rates of batteries can also be reduced by controllably operating the batteries within a comfortable temperature range (e.g., the temperature range of a lithium battery is usually in a range of about 10° C. to about 45° C.).

Figure 7:
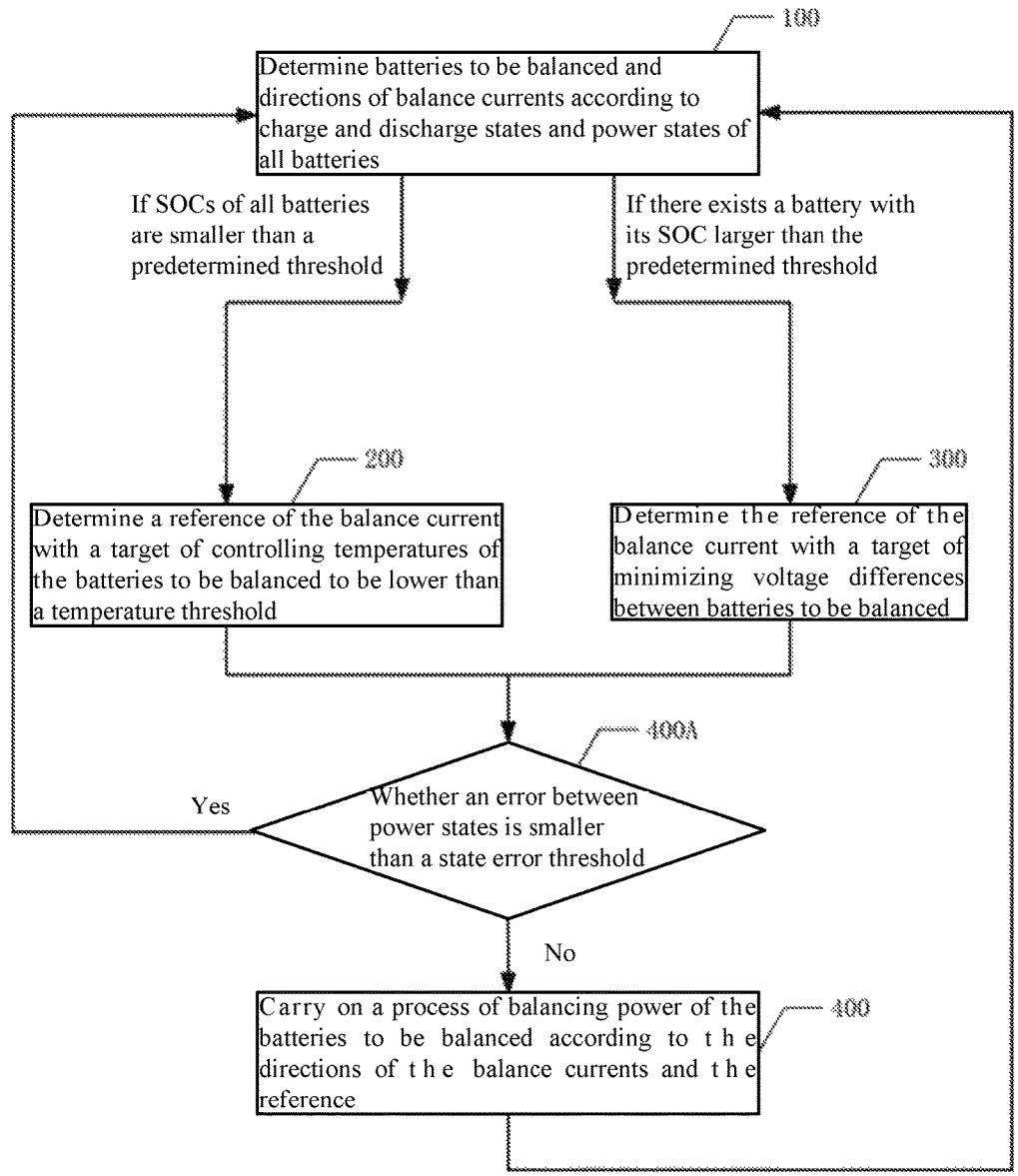
FIG. 7 is a flow diagram of an example method for balancing battery power, in accordance with embodiments of the present invention.

Referring now to FIG. 7, shown is a flow diagram of an example method for balancing battery power, in accordance with embodiments of the present invention. In this particular example, the method can include step 400A prior to 400, which can be used to determine if the difference between power states of batteries to be balanced is less than the state difference threshold (e.g., about 5%). If yes, the flow may jump back step 100, and power balance may not be executed. If not, step 400 can be executed. For example, battery power state may be any one or more of SOC, RCC, FCC-RCC, etc. Thus, repeatedly carrying on power balance when the power states are relatively close to each other can be substantially avoided, so as to improve system efficiency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of balancing battery power, the method comprising:
   a) determining batteries to be balanced and directions of balance currents according to charge and discharge states and power states of said batteries, wherein each of said power states comprises a state of charge (SOC), a remaining capacity, and a capacity to be charged;
   b) determining a reference of said balance currents based on controlling temperatures of said batteries to be balanced to be lower than a temperature threshold when said SOCs of said batteries to be balanced are lower than a predetermined threshold;
   c) balancing power of said batteries to be balanced according to said directions of said balance currents and said reference; and
   d) reducing said battery temperatures to be lower than said temperature threshold by regulating said balance currents when said battery temperatures are inadvertently increased to be greater than said temperature threshold.

2. The method of claim 1, wherein said determining said batteries to be balanced and said directions of said balance currents comprises:
   a) obtaining said charge and discharge states and said SOCs of said batteries;
   b) transmitting said balance current from a battery with a largest remaining capacity to a battery with a smallest remaining capacity when said SOCs of said batteries are less than said predetermined threshold and said batteries are in a discharge state; and
   c) transmitting said balance current from a battery with a smallest capacity to be charged to a battery with a largest capacity to be charged when said SOCs of said batteries are less than said predetermined threshold and said batteries are in a charge state, wherein said capacity to be charged equals a difference between a rated battery power and said remaining capacity.

3. The method of claim 2, wherein said determining said batteries to be balanced and said directions of said balance currents further comprises transmitting said balance current from a battery of a highest voltage to a battery of a lowest voltage when a battery has an SOC that is larger than said predetermined threshold.

4. The method of claim 3, further comprising determining said reference of said balance current based on minimizing voltage differences between said batteries to be balanced when said SOCs of said batteries to be balanced are higher than said predetermined threshold.

5. The method of claim 1, wherein said determining said reference of said balance current comprises:
   a) obtaining a first reference according to a temperature difference and a first gain when said current directions of said batteries to be balanced are the same as directions of said balance current;
   b) obtaining said first reference according to said temperature difference and a second gain when said current directions of said batteries to be balanced are different from directions of said balance current; and
   c) selecting a smaller one of said first reference and a maximum balance current as said reference of said balance current, wherein said temperature difference equals a difference between said temperature threshold and a temperature of said battery to be balanced, wherein said first gain is a negative value, and wherein said second gain is a positive value.

6. The method of claim 5, wherein said determining said reference of said balance current comprises:
   a) obtaining a voltage error parameter comprising an error between a voltage reference and said voltage difference; and
   b) obtaining said second reference according to said voltage error parameter and a third gain, and using said second reference as said reference of said balance current.

7. The method of claim 1, further comprising disabling said power balancing when said difference between said state of charge of batteries to be balanced is less than a state difference threshold.

8. The method of claim 2, wherein said obtaining said charge and discharge states and said SOCs of said batteries comprises:
   a) disabling charge or discharge of said batteries until battery detection voltages equals an open circuit voltage when said battery current is lower than a current threshold; and
   b) obtaining said charge and discharge state and said SOCs by detecting said batteries.

* * * * *